United States Patent
Hershko et al.

(10) Patent No.: US 9,137,335 B2
(45) Date of Patent: Sep. 15, 2015

(54) OPERATING M-PHY BASED COMMUNICATIONS OVER MASS STORAGE-BASED INTERFACES, AND RELATED CONNECTORS, SYSTEMS AND METHODS

(71) Applicant: QUALCOMM Incorporated, San Diego, CA (US)

(72) Inventors: Yuval Corey Hershko, Haifa (IL); Yoram Rimoni, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/267,983

(22) Filed: May 2, 2014

(65) Prior Publication Data
US 2015/0052266 A1    Feb. 19, 2015

Related U.S. Application Data

(60) Provisional application No. 61/867,353, filed on Aug. 19, 2013, provisional application No. 61/867,343, filed on Aug. 19, 2013.

(51) Int. Cl.
| | |
|---|---|
| G06F 13/36 | (2006.01) |
| H04L 29/06 | (2006.01) |
| H04W 40/00 | (2009.01) |
| H04W 80/00 | (2009.01) |
| G06F 13/38 | (2006.01) |
| G06F 13/42 | (2006.01) |

(52) U.S. Cl.
CPC .............. *H04L 69/03* (2013.01); *G06F 13/387* (2013.01); *G06F 13/4265* (2013.01); *H04W 40/00* (2013.01); *H04W 80/00* (2013.01); *G06F 13/42* (2013.01)

(58) Field of Classification Search
CPC .......................... G06F 13/387; G06F 13/4265
USPC ....................... 710/13–19, 313, 315; 711/103
See application file for complete search history.

(56) References Cited

U.S. PATENT DOCUMENTS

| | | | |
|---|---|---|---|
| 7,464,213 B2 | 12/2008 | Fukuda | |
| 7,664,902 B1 | 2/2010 | Chow et al. | |
| 7,827,337 B2* | 11/2010 | Jeong | ............................ 710/113 |
| 8,047,437 B2 | 11/2011 | Ado | |
| 8,359,418 B2 | 1/2013 | Bryant-Rich | |
| 2008/0288698 A1 | 11/2008 | Lin et al. | |
| 2011/0072185 A1 | 3/2011 | Pinto et al. | |
| 2012/0185663 A1 | 7/2012 | Yokoya et al. | |
| 2013/0097460 A1 | 4/2013 | Jeong et al. | |
| 2014/0122767 A1* | 5/2014 | Hershko et al. | ................ 710/313 |
| 2014/0244904 A1* | 8/2014 | Kondo et al. | .................. 711/103 |

OTHER PUBLICATIONS

Chung Y., "UFS PHY & UniPro®," JEDEC, Global Standards for the Microelectronics Industry, Taiwan Mobile Memory Workshop, Oct. 12, 2011, Slides. 1-56.
International Search Report and Written Opinion for PCT/US2014/051482, mailed Nov. 3, 2014.

\* cited by examiner

*Primary Examiner* — Tammara Peyton
(74) *Attorney, Agent, or Firm* — Withrow & Terranova, PLLC

(57) ABSTRACT

M-PHY communications are provided over a mass storage-based interface. Related connectors, systems, and methods are also disclosed. In particular, embodiments of the present disclosure take the M-PHY standard compliant signals and direct them through a memory card compliant connector so as to allow two M-PHY standard compliant devices having memory card based connectors to communicate.

20 Claims, 12 Drawing Sheets

| Pin Num | Pin Name | SD SPI | | M-PHY | |
|---|---|---|---|---|---|
| | | Master/ Host Side Role | Slave/ Device Side Role | Master/ Host Side Role | Slave/ Device Side Role |
| 1 | CS | Chip Select | | Hot-Plug presence detect | |
| 2 | DI | Data Output | Data Input | TXDP | RXDP |
| 3 | VSS | Ground | Ground | Ground (optional) | Ground (optional) |
| 4 | VDD | Supply | Supply | Supply (optional) | Supply (optional) |
| 5 | SCLK | Clock | | Clock (optional) | |
| 6 | VSS2 | Ground | Ground | Ground (optional) | Ground (optional) |
| 7 | DO | Data Input | Data Output | RXDP | TXDP |
| 8 | RSV | Reserved | | TXDN | RXDN |
| 9 | RSV | Reserved | | RXDN | TXDN |

*FIG. 2A*

| Pin Num | Pin Name | SD | | M-PHY | |
|---|---|---|---|---|---|
| | | Master/Host Side Role | Slave/Device Side Role | Master/Host Side Role | Slave/Device Side Role |
| 1 | CD/DAT3 | Card Detect/Data #3 | | RXDP | TXDP |
| 2 | CMD | Command | Response | Command (optional) | Response (optional) |
| 3 | VSS1 | Ground | Ground | Ground (optional) | Ground (optional) |
| 4 | VDD | Supply | Supply | Supply (optional) | Supply (optional) |
| 5 | CLK | Clock | | Clock (optional) | |
| 6 | VSS2 | Ground | Ground | Ground (optional) | Ground (optional) |
| 7 | DAT0 | Data #0 | | TXDP | RXDP |
| 8 | DAT1 | Data #1 | | TXDN | RXDN |
| 9 | DAT2 | Data #2 | | RXDN | TXDN |

*FIG. 2B*

| Pin Num | Pin Name | UHS-II Master/Host Side Role | UHS-II Slave/Device Side Role | M-PHY Master/Host Side Role | M-PHY Slave/Device Side Role |
|---|---|---|---|---|---|
| 1 | RSV | Legacy mode | Legacy mode | TXDP1 | RXDP1 |
| 2 | RSV | Legacy mode | Legacy mode | TXDN1 | RXDN1 |
| 3 | RSV | Legacy mode | Legacy mode | RXDN1 | TXDN1 |
| 4 | VDD1 | Supply | Supply | Supply (optional) | Supply (optional) |
| 5 | RSV | Legacy mode | Legacy mode | RXDP1 | TXDP1 |
| 6 | RSV | Legacy mode | Legacy mode | Reserved | Reserved |
| 7 | RCLK+ | | Clock Input | Clock (optional) | Clock (optional) |
| 8 | RCLK- | | Clock Input | Clock (optional) | Clock (optional) |
| 9 | RSV | Legacy mode | Legacy mode | Reserved | Reserved |
| 10 | VSS3 | Ground | Ground | Ground (optional) | Ground (optional) |
| 11 | D0+ | Output data | Input data | TXDP0 | RXDP0 |
| 12 | D0- | Output data | Input data | TXDN0 | RXDN0 |
| 13 | VSS4 | Ground | Ground | Ground (optional) | Ground (optional) |
| 14 | VDD4 | Supply | Supply | Supply (optional) | Supply (optional) |
| 15 | D1- | Input data | Output data | RXDN0 | TXDN0 |
| 16 | D1+ | Input data | Output data | RXDP0 | TXDP0 |
| 17 | VSS5 | Ground | Ground | Ground (optional) | Ground (optional) |

*FIG. 2C*

|  |  | MMC Plus | | M-PHY | |
|---|---|---|---|---|---|
| Pin Num | Pin Name | Master/ Host Side Role | Supply/ Device Side Role | Master/ Host Side Role | Supply/ Device Side Role |
| 1 | DAT3 | Databit 3 | | | RXDP0 |
| 2 | CMD | COMMAND/RESPONSE | | COMMAND/RESPONSE(OPTIONAL) | |
| 3 | VSS | GROUND | | GROUND | |
| 4 | VDD | SUPPLY VOLTAGE | | SUPPLY VOLTAGE | |
| 5 | CLK | CLOCK | | CLOCK | |
| 6 | VSS | GROUND | | GROUND | |
| 7 | DAT0 | Databit 0 | | | TXDP0 |
| 8 | DAT1 | Databit 1 | | | TXDN0 |
| 9 | DAT2 | Databit 2 | | | RXDN0 |
| 10 | DAT4 | Databit 4 | | | TXDP1 |
| 11 | DAT5 | Databit 5 | | | TXDN1 |
| 12 | DAT6 | Databit 6 | | | RXDN1 |
| 13 | DAT7 | Databit 7 | | | RXDP1 |

FIG. 2D

OPERATING M-PHY BASED COMMUNICATIONS OVER MASS STORAGE-BASED INTERFACES, AND RELATED CONNECTORS, SYSTEMS AND METHODS

PRIORITY APPLICATIONS

The present application claims priority to and the benefit of U.S. Provisional Patent Application Ser. No. 61/867,353, filed on Aug. 19, 2013, entitled "OPERATING M-PHY BASED COMMUNICATIONS OVER MASS STORAGE-BASED INTERFACES, AND RELATED CONNECTORS, SYSTEMS AND METHODS," which is incorporated herein by reference in its entirety.

The present application also claims priority to and the benefit of U.S. Provisional Patent Application Ser. No. 61/867,343, filed on Aug. 19, 2013, entitled "OPERATING M-PHY BASED COMMUNICATIONS OVER MASS STORAGE-BASED INTERFACES, AND RELATED CONNECTORS, SYSTEMS AND METHODS," which is incorporated herein by reference in its entirety.

BACKGROUND

I. Field of the Disclosure

The technology of the present disclosure relates generally to communications interfaces used for communications between electronic devices.

II. Background

Electronic devices have proliferated throughout society supporting a wide range of applications and uses. As the number and variety of devices expand, there is an increasing need for electronic devices to communicate with one another. In response to this need, various protocols have been proposed and adopted. In many instances, the protocols define signal levels, associated data representations and timing that are communicated between the electronic devices. Examples of these protocols include wireless communications, such as the 802.11 standards set forth by the Institute of Electrical and Electronics Engineers (IEEE) and BLUETOOTH®. Wireless signal protocols may also specify frequency and power levels. Others of these protocols are wire-based. In the event that a protocol is wire-based, a standardized physical connector may be required to effectuate communications between the devices. Various physical connectors, for example Registered Jack-11 (RJ-11), RJ-14, RJ-21, RJ-45, and RJ-49, have been used successfully for various purposes and protocols.

With the increase of mobile platform devices, and the increased functionality in each of these devices, data rates between peripherals have seen exponential growth. In this regard, the Mobile Industry Processor Interface (MIPI®) Alliance has recently proposed the M-PHY® physical layer standard defining a data rate of 10 Kbps to 5.8 Gbps per lane. The M-PHY standard is optimized for mobile applications, such as cameras, displays for mobile terminals, smart phones, and the like. However, while the M-PHY standard provides a serial interface technology with high bandwidth capabilities, the M-PHY specification deliberately avoids connector definitions and advocates for a permanent trace based connection between devices. Permanent trace based connections eliminate the flexibility of user desired connections.

SUMMARY OF THE DISCLOSURE

Embodiments disclosed in the detailed description include operating the M-PHY communications over a mass storage-based interface. Related connectors, systems, and methods are also disclosed. In particular, embodiments of the present disclosure take the M-PHY standard compliant signals and direct them through a memory card compliant connector so as to allow two M-PHY standard compliant devices having memory card based connectors to communicate. Reusing the form factor of the memory card allows for efficiencies in manufacturing and acceptance within the industry as there is a solid manufacturing base for these connectors and an understanding of their physical limitations, which assists designers in incorporating such connectors into their products.

In another embodiment, a method of ascertaining what sort of card has been put into a host device receptacle is disclosed. The method includes detecting insertion of a memory card connector into a memory card form factor receptacle. The method also comprises determining if the memory card connector is associated with a memory card or is operating according to an M-PHY protocol. The method also comprises operating on the determining.

In another embodiment, a method of ascertaining what sort of card has been put into a host device receptacle is disclosed. The method comprises detecting insertion of a memory card connector into a memory card form factor receptacle. The method also comprises providing a first command to logic within the memory card connector, the first command uniquely associated with a first memory card communication protocol. The method also comprises determining if a first reply to the first command is provided from the logic within the memory card connector to the host device. The method also comprises if no first reply is provided, providing a second command to the logic within the memory card connector, the second command associated with a second memory card communication protocol. The method also comprises determining if a second reply to the second command is provided from the logic within the memory card connector to the host device. The method also comprises if no second reply is provided, operating according to an M-PHY protocol.

In another embodiment, a non-transitory computer readable medium is disclosed. The medium comprises software with instructions to detect insertion of a memory card connector into a memory card form factor receptacle. The medium also comprises software with instructions to determine if the memory card connector is associated with a memory card or is operating according to an M-PHY protocol. The medium also comprises software with instructions to operate based on the determining.

In another embodiment, a computing device is disclosed. The device comprises a receptacle configured to hold a memory card connector and having electrical contact configured to mate to contacts in a memory card form factor. The device also comprises a control system operatively coupled to the electrical contacts and configured to detect insertion of the memory card connector into the receptacle. The control system is also configured to determine if the memory card connector is associated with a memory card or is operating according to an M-PHY protocol. The control system is also configured to operate based on the determining.

BRIEF DESCRIPTION OF THE FIGURES

FIG. 2A is a table illustrating an exemplary mapping of Serial Peripheral Interface (SPI) style memory card pins to an M-PHY data path for an M-PHY standard;

FIG. 2B is a table illustrating an exemplary mapping of SD style memory card pins to an M-PHY data path for an M-PHY standard;

FIG. 2C is a table illustrating an exemplary mapping of UHS-II style memory card pins to an M-PHY data path for an M-PHY standard;

FIG. 2D is a table illustrating an exemplary mapping of MMC style memory card pins to an M-PHY data path for an M-PHY standard;

DETAILED DESCRIPTION

Figure 1A:
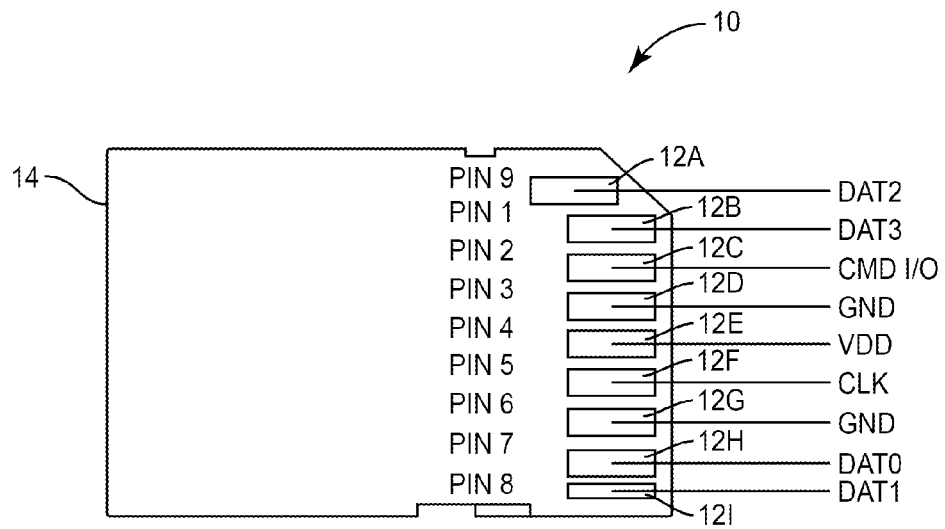
FIG. 1A is a top plan view of an exemplary conventional Secure Digital™ (SD) style memory card with pin layout.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include operating the M-PHY communications over a mass storage-based interface. Related connectors, systems, and methods are also disclosed. In particular, embodiments of the present disclosure take the M-PHY standard compliant signals and direct them through a memory card compliant connector so as to allow two M-PHY standard compliant devices having memory card based connectors to communicate. Reusing the form factor of the memory card allows for efficiencies in manufacturing and acceptance within the industry as there is a solid manufacturing base for these connectors and an understanding of their physical limitations, which assist designers in incorporating such connectors into their products.

The Mobile Industry Processor Interface (MIPI®) Alliance has proposed the M-PHY standard, which is a physical layer protocol detailing how devices communicate with one another. However, the MIPI® Alliance has to date, not defined or constrained the M-PHY standard to a particular connector type that complies with the standard, leaving the design of the physical connectors to the entities deploying products in this space. While it is possible to design such a physical connector without reference to any existing connector type, an existing connector is adapted herein to satisfy the signal integrity and other requirements of the MIPI® Alliance M-PHY standard. In particular, the memory card industry has a number of predefined form factors each of which has a plurality of electrical connections (pins). Even within an existing memory card standard there may be sub form factors (e.g., Secure Digital (SD) has formats including SD, miniSD, microSD, SDHC, miniSDHC, microSDHC, etc.). As noted, each of these form factors has a plurality of electrical connections (pins) which allow communication with the logic and/or memory cells within the memory card. The existence of these pins allows for an opportunity in which the form factor may be repurposed for use with M-PHY compliant devices and the pins on the form factor are used to carry M-PHY compliant signals. While there are several proprietary pin layouts within the memory card industry, the form factors associated with each memory card are well documented and understood and thus may be repurposed as further disclosed herein. As a non-limiting example, the memory card form factor that is adapted to be used for the MIPI® Alliance M-PHY standard can be any of a Compact Flash (I and II), Secure Digital (SD) (SD, miniSD, microSD, SDHC, miniSDHC, microSDHC, SDXC), Memory Stick (Standard, Pro, Pro Duo, Pro-HG Duo, Micro (M2), xC), MultiMediaCard (MMC) (MMC, RS-MMC, MMCmobile, MMCplus, MMCmicro, eMMC), Serial Peripheral Interface (SPI) mode of operation within a card format, xD (Standard, Type M, Type H, Type M+), XQD, or Ultra High Speed (UHS) (I and II) pin layout. Before discussing the embodiments of adapting memory card connectors to the M-PHY standard, memory card connectors are first discussed with regard to FIGS. 1A-1D. The discussion of exemplary embodiments of the present disclosure begins below with respect to FIG. 2A.

In this regard, FIGS. 1A-1D illustrate exemplary conventional memory cards alone and in use with a host device (note that the host device is sometimes referred to as a memory card controller or card controller). Typical uses for such memory cards are in digital cameras, smart phones, and other small portable devices. Data is typically acquired through the small portable device and stored on the memory card. Subsequently, the card is removed and inserted into a receptacle on a computing device such as a desk top computer, and the files transferred to the computing device. Such uses are well understood in the industry. However, a brief overview of the physical attributes and functions is provided in the interest of completeness.

Figure 2E:
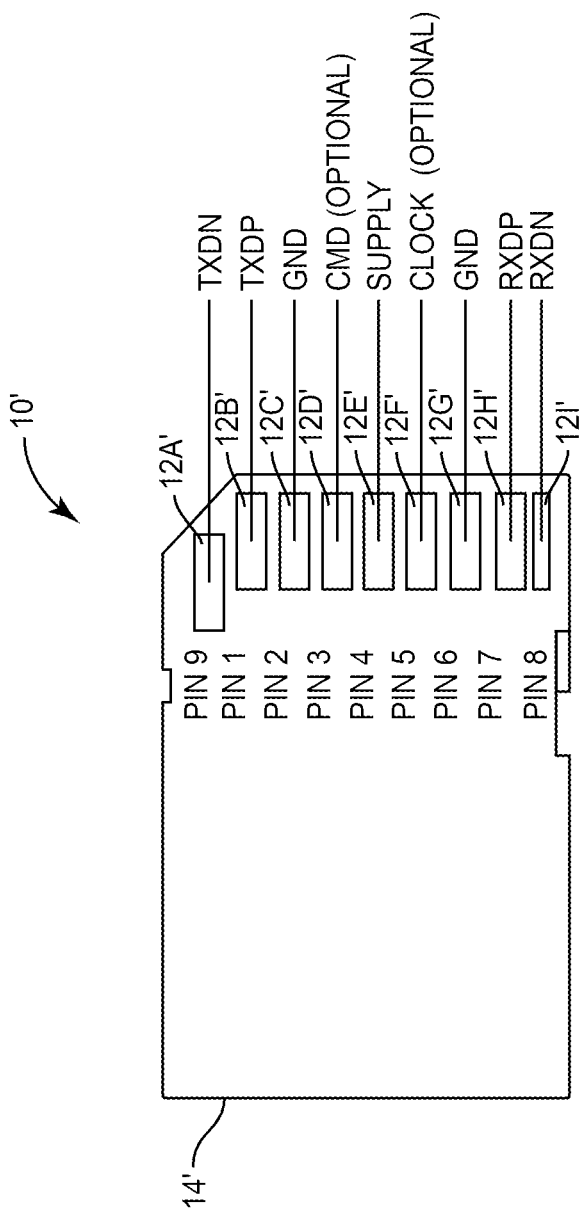
FIG. 2E is a top plan view of an exemplary embodiment SD style memory card form factor repurposed for an M-PHY standard.

In this regard, FIG. 1A illustrates an SD card 10 having pins 12A-12I (collectively pins 12). The SD card 10 has a generally pentagonally shaped housing 14 usually made of plastic or other polymeric material. The pins 12 are usually flush or slightly recessed within the housing 14 and form a conductive contact area through which an electrical connection can be made. TABLE 1, below, lists the conventional pin assignment along with the present disclosure's reference number for each pin 12.

TABLE 1

Conventional SD Pin Assignment

| SD PIN # | Disclosure # | SD Signal Name | SD Description |
|---|---|---|---|
| 1 | 12B | CD/DAT3 | Card detect/Data #3 |
| 2 | 12C | CMD | Command/response |
| 3 | 12D | VSS1 | Ground |
| 4 | 12E | VDD | Supply Voltage |
| 5 | 12F | CLK | Clock |
| 6 | 12G | VSS2 | Ground |
| 7 | 12H | DAT0 | Data #0 |
| 8 | 12I | DAT1 | Data #1 |
| 9 | 12A | DAT2 | Data #2 |

For more information about the SD specification, the interested reader is referred to SD Specifications, Part 1, Physical Layer Simplified Specification, version 2.00, Sep. 25, 2006, available from the SD Group at mac6.ma.psu.edu/, which is hereby incorporated by reference in its entirety. Still further, the interested reader may be able to access versions 3.00 or 4.00 published by the SD Group.

Figure 1B:
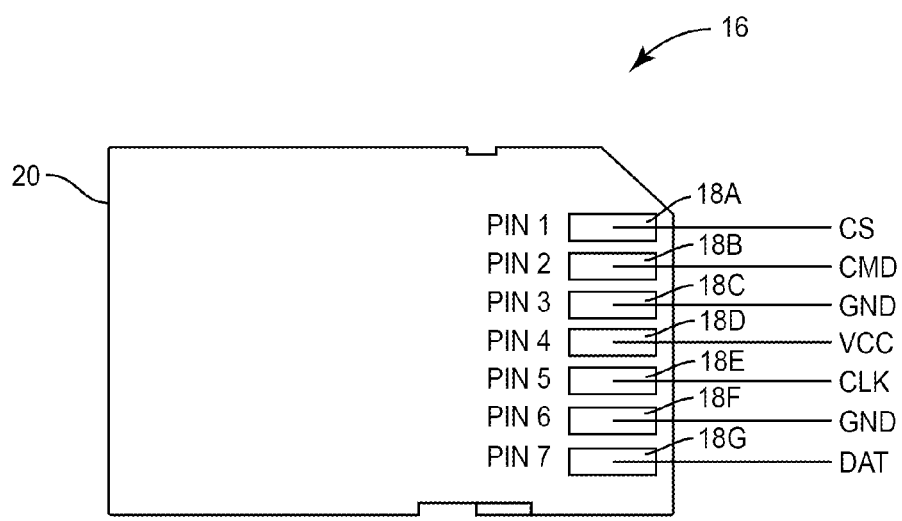
FIG. 1B is a top plan view of an exemplary conventional MultiMediaCard (MMC) style memory card with pin layout.

The SD memory card 10 is an evolution of an earlier card, namely the MMC. An exemplary conventional MMC 16 is illustrated in FIG. 1B. The MMC 16 has pins 18A-18G (collectively pins 18). The MMC 16 has a generally pentagonally shaped housing 20 that is substantially identical to the housing 14 of the SD card 10. The primary difference is that the SD card 10 has two additional pins (i.e., pins 12A and 12I) beyond the seven pins of the MMC 16. TABLE 2, below, lists the conventional pin assignment along with the present disclosure's reference number for each pin 18.

TABLE 2

Conventional MMC Pin Assignment

| MMC PIN # | Disclosure # | MMC Signal Name | MMC Description |
|---|---|---|---|
| 1 | 18A | CS | Chip Select |
| 2 | 18B | CMD | Command/Response |
| 3 | 18C | GND | Ground |
| 4 | 18D | VCC | Supply Voltage |
| 5 | 18E | CLK | Clock |
| 6 | 18F | GND | Ground |
| 7 | 18G | DAT | Data |

Figure 1C:
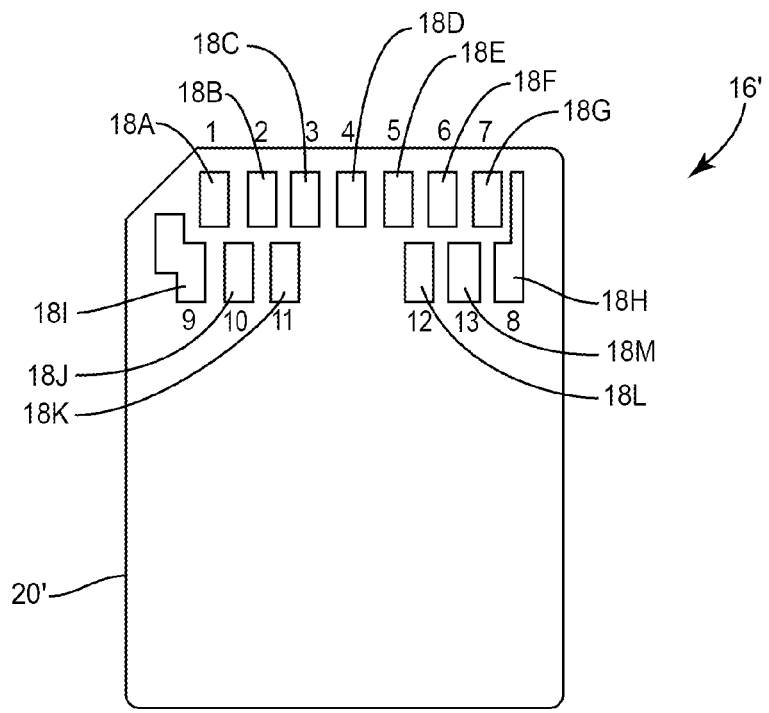
FIG. 1C is a top plan view of an exemplary conventional MMCplus style memory card with pin layout.

As noted above, MMC is an even older standard than the SD standard and the industry is well acquainted with manufacturing cards compliant with the standard and manipulations thereof. Also note that while the standard MMC has seven pins, permutations of the MMC do exist with more pins (e.g. MMCPlus, MMCmicro, eMMC). The older, basic MMC (as well as RS-MMC and SecureMMC), with only seven pins is not well suited to repurposing as described herein. However, subsequent iterations of the MMC standard starting with MMCPlus (e.g., MMCplus, MMCmobile), which has thirteen pins are suitable for the repurposing described herein. Thus, FIG. 1C illustrates a conventional MMCplus card 16' with a housing 20' substantially similar to the housing 20. The MMCplus card 16' has pins 18A-18G identical to the pins 18A-18G of the MMC card 16 (FIG. 1B), but also adds additional pins 18H-18L allowing additional data channels. TABLE 3, below, lists the conventional pin assignment along with the present disclosure's reference number for each pin 18.

TABLE 3

Conventional MMCPLUS Pin Assignment

| MMC PIN # | Disclosure # | MMC Signal Name | MMC Description |
|---|---|---|---|
| 1 | 18A | DAT3 | Data |
| 2 | 18B | CMD | Command/Response |
| 3 | 18C | VSS | Ground |
| 4 | 18D | VDD | Supply Voltage |
| 5 | 18E | CLK | Clock |
| 6 | 18F | VSS | Ground |
| 7 | 18G | DAT0 | Data |
| 8 | 18H | DAT1 | Data |
| 9 | 18I | DAT2 | Data |
| 10 | 18J | DAT4 | Data |
| 11 | 18K | DAT5 | Data |
| 12 | 18L | DAT6 | Data |
| 13 | 18M | DAT7 | Data |

While only three conventional card pin layouts are illustrated in FIGS. 1A-1C, it should be appreciated that other conventional memory cards are likewise well understood. Thus, while pin layouts are not provided for MMCMicro, CompactFlash, Memory Stick, SPI, xD, XQD, or UHS, cards using these formats are well established and published standards for each format exist, and the interested reader may learn more through the publications of the relevant standard setting bodies (e.g., JEDEC).

Figure 1D:
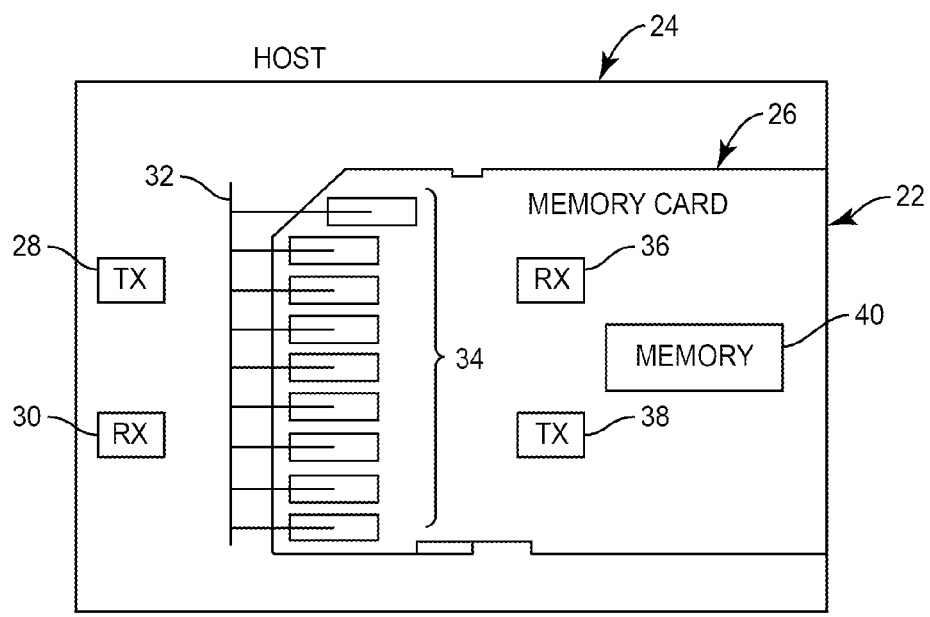
FIG. 1D is a simplified schematic of a conventional memory card inserted into a host device.

Each memory card is configured to be used in some sort of device, sometimes referred to as a host device or a memory card controller, whether that device is a portable electronic device such as a digital camera or a more stationary device such as a desktop computer. FIG. 1D illustrates a simplified schematic of a conventional card 22 plugged into a conventional host 24. In particular, the host 24 includes a receptacle 26 sized to accommodate the standard sized card 22. Additionally, the host 24 includes a transmit (TX) element 28 and a receive (RX) element 30 configured to interoperate with electrical contacts 32 to provide signals to and receive signals from the card 22. In particular, the card 22 includes contacts or pins 34 which electrically couple to the electrical contacts 32 of the host 24 to effectuate a communication path as is well understood. The card 22 further includes a RX element 36 and a TX element 38 as well as a computer readable memory 40. The RX element 36 and the TX element 38 interoperate with the pins 34 to receive signals from and send signals to the host 24 as is well understood.

Similar tables may readily be created for other formats of memory cards. Because the memory card standards are well established, the industry has had time to develop a standardized form factor. There are numerous manufacturers capable of manufacturing connectors according to the well-established form factor. Likewise, stress and bend tolerances and other fatigue related tolerances and the like are well understood by those who use such connectors. Many specific definitions and requirements are set forth in the memory card specifications and the industry has acclimated to meeting these definitions and requirements.

The present disclosure takes advantage of the familiarity with which industry treats the memory card style connectors and particularly with housing of the cards 10, 16, 16', 22 (and corresponding receptacles 26) and proposes repurposing such connectors for use with M-PHY standard compliant devices. In particular, use of the existing memory card style connectors in an M-PHY standard compliant device allows all of the expertise and familiarity the industry has with the memory card style connectors to be leveraged into ready acceptance of its use with M-PHY standard compliant devices. The well-developed manufacturing base allows for ease in securing the connectors for incorporation into M-PHY standard compliant devices. That is, there will be little or no lag time in securing an acceptable manufacturer of connectors for ready inclusion in M-PHY standard compliant devices and the competition between existing manufacturers means that the cost of the individual connectors will likely be reasonable. Similarly, because the connectors are currently made in high volumes, there may be reductions in cost because of appropriate economies of scale.

While many of the various card formats may be repurposed according to exemplary embodiments of the present disclosure, only a few are illustrated herein. In general, the repurposing takes pins devoted to data or pins that are reserved and uses such pins to form differential data pin pairs that carry the differential M-PHY data signals. Clock signals, power signals, and insertion detection pins may be preserved. While this general repurposing is specifically contemplated, other repurposing is possible that completely shuffles the purpose of the pins in the existing form factors. In this regard, with reference to FIG. 2A, a chart 42 is provided to illustrate the mapping of the M-PHY standard compliant pin names to the corresponding SD card connector in serial peripheral interface (SPI) mode. In particular, FIG. 2A illustrates that the pins for the Data Input (DI), Reserved (RSV), Data Output (DO), and second RSV lines are repurposed from their respective SPI signal use to a corresponding M-PHY signal use. Thus, in exemplary embodiments of the present disclosure, the DI pin which was used for data input is used for the TXDP signal; the first RSV pin which was reserved for future standard development is used for the TXDN signal; the DO pin which was used for data output signal is used for the RXDN signal; and the second RSV pin which was reserved for future standard development is used for the RXDP signal.

With reference to FIG. 2B, a chart 44 illustrates the mapping of the M-PHY standard compliant pin names to the corresponding SD card connector signals (without SPI operation). In particular, FIG. 2B illustrates that the pins for the DAT0, DAT1, DAT2, and DAT3 lines are repurposed from their respective SD signal use to a corresponding M-PHY signal use. Thus, in exemplary embodiments of the present disclosure, the DAT0 pin which was used for data input is used for the TXDP signal; the DAT1 pin which was used for data input is used for the TXDN signal; the DAT2 pin which was used for data output signal is used for the RXDN signal; and the DAT3 pin which was used for data output signal is used for the RXDP signal.

With reference to FIG. 2C, a chart 46 illustrates the mapping of the M-PHY standard compliant pin names to the corresponding UHS-II card connector signals. In particular, FIG. 2C illustrates that the pins for the D0+, D0−, D1+, and D1− lines are repurposed from their respective UHS-II signal use to a corresponding M-PHY signal use. Thus, in exemplary embodiments of the present disclosure, the D0+ pin which was used for data input is used for the TXDP signal; the D0− pin which was used for data input is used for the TXDN signal; the D1+ pin which was used for data output signal is used for the RXDN signal; and the D0− pin which was used for data output signal is used for the RXDP signal. Note that the second lane formed by pins 1, 2, 3, and 5 is optional and uses four reserved pins for the second differential lane.

With reference to FIG. 2D, the chart 48 illustrates the mapping of the M-PHY standard compliant pin names to the corresponding MMCplus connector signals. In particular, FIG. 2D illustrates that the pins for the DAT0 through DAT7 lines are repurposed from their respective MMC signal use to a corresponding M-PHY signal use. Thus, in exemplary embodiments of the present disclosure, the DAT0 and DAT1 pins which were used for data input are used for the TXDP0 and TXDN0 signals; the DAT2 and DAT3 pins which were used for data output are used for the RXDN0 and RXDP0 signals; the DAT4 and DAT5 pins which were used for data input signals are used for the TXDP1 and TXDN1 signals; and the DAT6 and DAT7 pins which were used for data output signals are used for the RXDN1 and RXDP1 signals. Note that the second lane formed by pins 10, 11, 12, and 13 is optional, an implementation could use just one differential lane formed by pins 1, 7, 8, and 9.

While the charts in FIGS. 2A-2D are helpful in knowing the reassignment patterns for a particular memory card form factor, it may also be helpful to see a repurposed memory card form factor. In this regard, FIG. 2E illustrates a top plan view of a repurposed SD style memory card form factor connector 10' with pins 12A'-12I' (collectively pins 12'). The pins 12' are positioned within housing 14'. The housing 14' is sized identically to the housing 14 of FIG. 1A and the pins 12' are positioned in the same spots as pins 12 of FIG. 1A. However, as explained above, the repurposing of the pins 12 allows the memory card form factor connector 10' to operate according to the M-PHY protocol. Additionally, the pin layout and repurposing is designed to place the two pins of each differential pair proximate one another (e.g., pins 1 and 9 carry the TXDN and TXDP differential pair and pins 7 and 8 carry the RXDP and RXDN differential pair) while the actual pairs are separate from one another (e.g., the transmit is on one edge of the memory card connector and the receive is on the opposite edge). The repurposing of the pins 12' is summarized in TABLE 4 below.

TABLE 4

M-PHY SD Pin Assignment

| SD PIN # | Disclosure # | M-PHY Signal Name | SD Description |
|---|---|---|---|
| 1 | 12B' | TXDP | Data #3 |
| 2 | 12C' | CMD (optional) | Command/response |
| 3 | 12D' | Ground | Ground |
| 4 | 12E' | Supply | Supply Voltage |
| 5 | 12F' | Clock (optional) | Clock |
| 6 | 12G' | Ground | GND |
| 7 | 12H' | RXDP | Data #0 |
| 8 | 12I' | RXDN | Data #1 |
| 9 | 12A' | TXDN | Data #2 |

This remapping of data channels from the memory card standards and protocols allows the same form factor for the conventional memory cards to be used with M-PHY compliant devices. Further, given the industry's awareness and well settled manufacturing processes for making memory cards with the standardized memory card form factor, there should be a readily available manufacturing chain for M-PHY devices that implement such standardized connections.

Figure 3A:
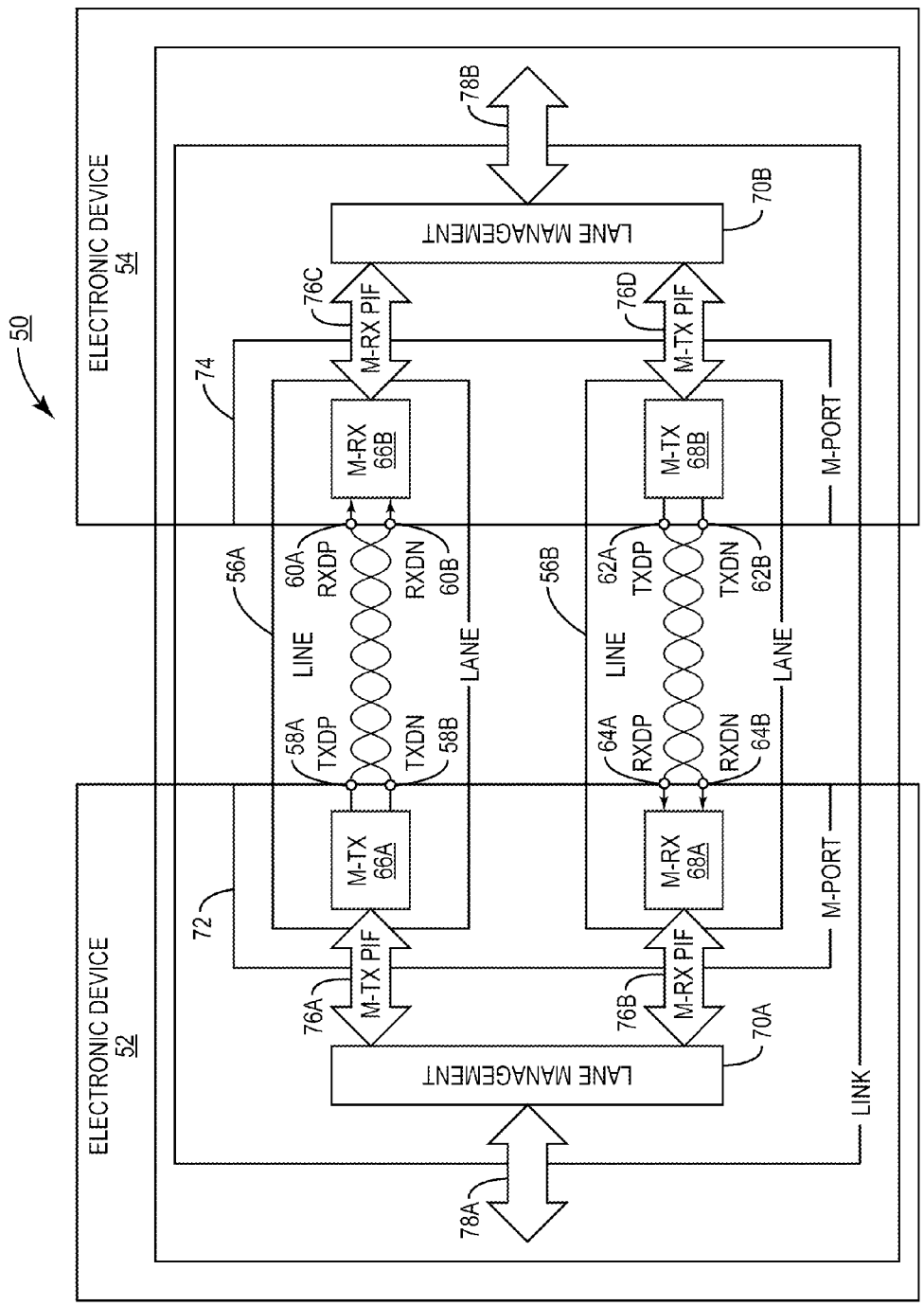
FIG. 3A is a block diagram of an exemplary embodiment of a conventional M-PHY single lane signal path layout for connection of M-PHY standard compliant electronic devices.

An exemplary conventional M-PHY signal path layout 50 with pin requirements is provided with reference to FIG. 3A. That is, a first electronic device 52 is connected to a second electronic device 54. The first electronic device 52 can include a control system or processor (discussed below in regard to FIG. 6), which may, through appropriate device drivers, control the signal lanes 56A, 56B of a communications interface (sometimes referred to herein as a means for interfacing) according to the M-PHY standard. The signal lane 56A is the lane through which the first electronic device 52 transmits data to the second electronic device 54 through the TXDP and TXDN pins 58A, 58B to RXDP and RXDN pins 60A, 60B. Likewise, the second electronic device 54 transmits data to the first electronic device 52 through the TXDP and TXDN pins 62A, 62B to RXDP and RXDN pins 64A, 64B. Each electronic device 52, 54 has its own respective transmitter M-TX 66A, 68B and receiver M-RX 68A, 66B controlled by respective lane management module 70A, 70B. The lane management modules 70A, 70B may be hardware or software or a mix of the two as desired and may communicate with the control system via links 78A, 78B. The pins 58A, 58B, 64A, 64B may be in a single M-Port 72, and the pins 60A, 60B, 62A, 62B by virtue of their presence on a second, different device are defined to be in a second M-Port 74.

With continuing reference to FIG. 3A, the lane management module 70A may communicate with the transmitter 66A through a peripheral interchange format (PIF) link 76A and with the receiver 68A through a PIF link 76B. Likewise, the lane management module 70B may communicate with the receiver 66B through a PIF link 76C and the transmitter 68B through a PIF link 76D. The lane management modules 70A, 70B, the links 78A, 78B, the transmitters 66A, 68B, receivers 66B, 68A, and PIF links 76A-76D are set forth in the M-PHY standard, and the interested reader is directed thereto for more information regarding these elements. As illustrated, the first electronic device 52 is directly connected to the second electronic device 54. While not explicitly illustrated, it should be appreciated that the direct connection could be replaced by a connector, cable, or combination. Again, the signals and lane management elements are defined by the M-PHY standard, but the arrangement of the pins and any connectors is left undefined. However, as noted with reference to FIGS. 2A-2E, memory card style connectors may be repurposed by mapping the data pins to the TXDP, TXDN, RXDN, and RXDP signal paths without requiring any physical changes to the memory card form factor. In this regard, the memory card form factor may sometimes be referred to herein as a means for connecting.

Figure 3B:
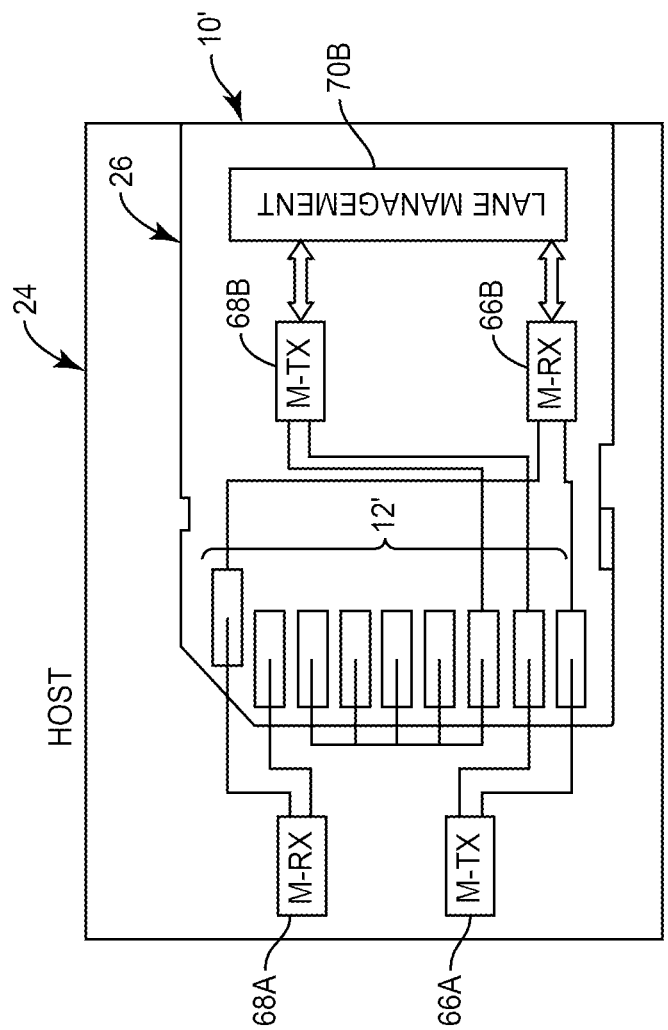
FIG. 3B is an exemplary embodiment of a simplified schematic of a repurposed memory card form factor inserted into a host device.

An exemplary simplified diagram of a repurposed memory card form factor connector 10' inserted into a host device 24 is provided in FIG. 3B. In particular, the memory card form factor connector 10' has pins 12' that couple to the output from the transmitter M-TX 66A and receiver M-RX 68A of the host device 24 through appropriate pins 58A, 58B, 64A, 64B (FIG. 3A). Inside the housing 14' of the memory card form factor connector 10' are receiver 66B and transmitter 68B as well as a conventional lane management 70B.

Figure 4:
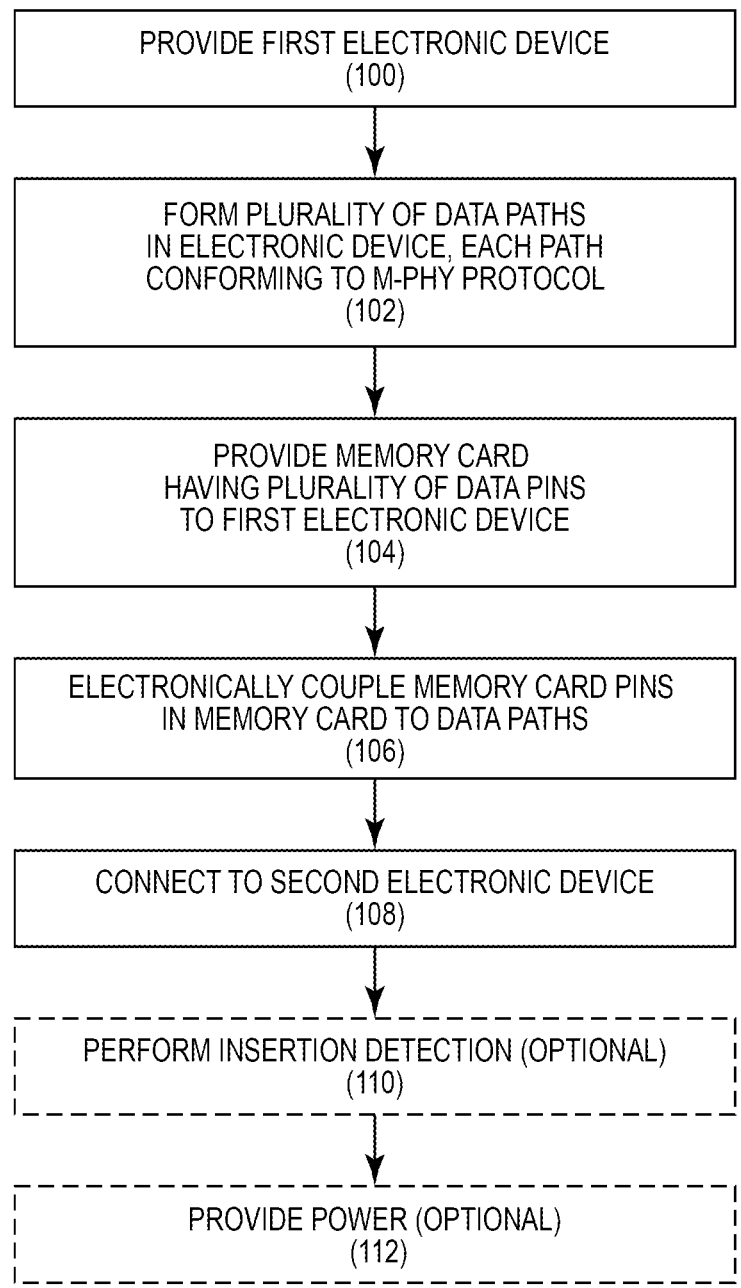
FIG. 4 is a flowchart illustrating an exemplary process for mapping memory card pins of a memory card form factor to M-PHY standard data paths.

Turning to FIG. 4, a flow chart is provided illustrating a method of connecting a first electronic device, such as electronic device 52, configured to operating using a M-PHY standard to a second electronic device, such as electronic device 54 through a mated connection, a cable with mated connectors or the like. Initially, the method provides an electronic device (block 100) and forms a plurality of data paths in the electronic device, wherein each path conforms to M-PHY standard (block 102). The method provides a memory card style connector having a plurality of pins to the first electronic device (block 104). In an exemplary embodiment, the memory card style connector conforms to one of the following standard form factors: SD, MMC, Compact Flash, Memory Stick, SPI, xD, XQD, or UHS.

With continuing reference to FIG. 4, the method electrically couples the pins in the memory card style form factor to the data paths (block 106). In an exemplary embodiment, the pins are mapped by electrically coupling a first transmit pin to a M-PHY TXDP data path, electrically coupling a second transmit pin to a M-PHY TXDN data path, electrically coupling a first receive pin to a M-PHY RXDN data path, and electrically coupling a second receive pin to a M-PHY RXDP data path. If the memory card connector form factor does not normally have four data paths, a reserved contact may be used in place thereof. Likewise, if the data paths are not specifically designated as transmit or receive data paths, such designations may be selected.

With continuing reference to FIG. 4, and with the data paths connected to the respective pins in the memory card style form factor, the first electronic device may be connected to a second electronic device (e.g., second device 54) (block 108). During connection or shortly thereafter, the control system associated with the connector may perform insertion detection (block 110) and/or provide power (block 112) to the second electronic device 54.

The above discussion has focused on repurposing the data paths in the memory card style form factor, but there are other pins within the memory card style form factor that may be used for other purposes such as insertion detection and/or power provision. For example, most memory cards include a power pin. The existence of a power pin allows for insertion detection and provides the ability to supply power to the second electronic device 54. Insertion detection allows the first electronic device 52 to know when it is acceptable to send data or listen for data from the second electronic device 54. Likewise, the second electronic device 54 should detect that the first electronic device 52 has been connected. Other advantages may also be realized through insertion detection, and the present disclosure is not so limited. Likewise, providing power to the second electronic device 54 allows the designers to avoid having to provide a power cord or alternate power source for the second electronic device 54.

Figure 5:
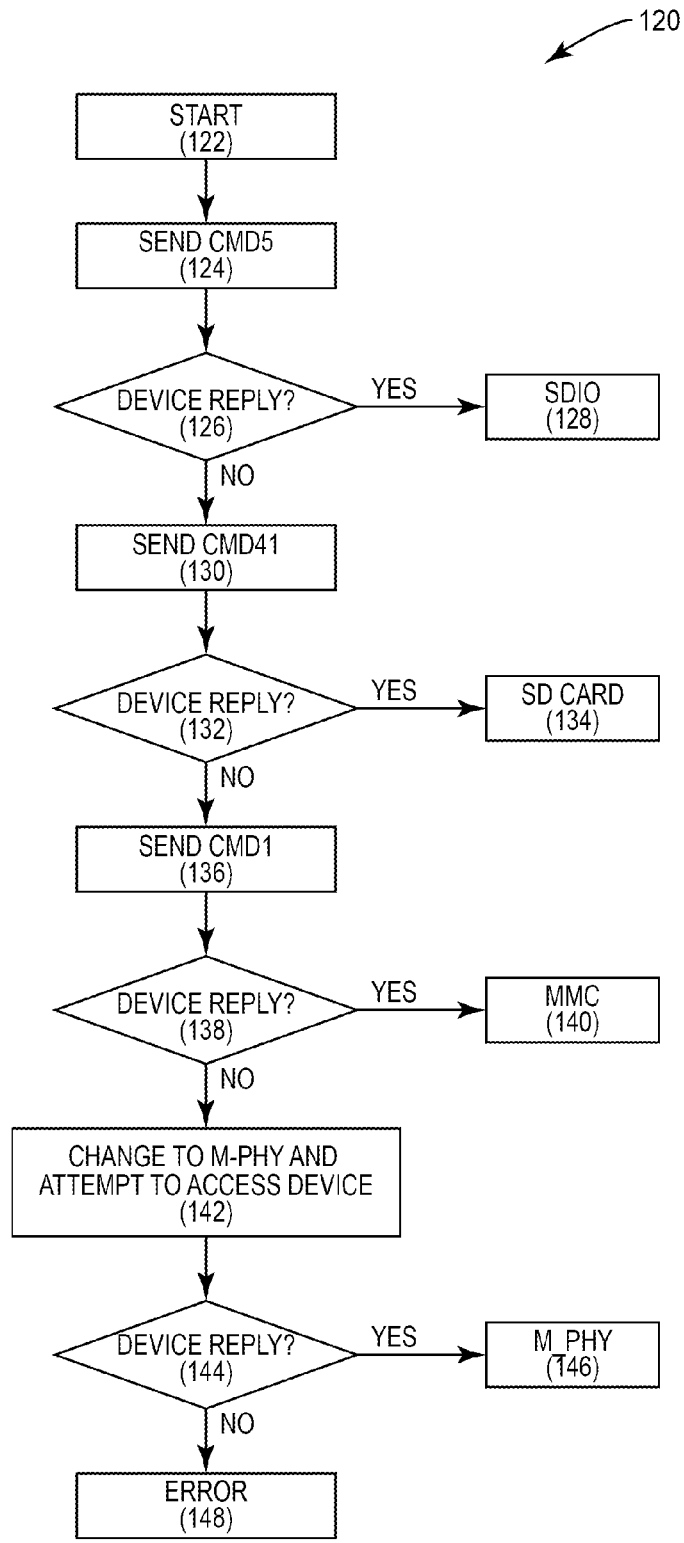
FIG. 5 is a flowchart illustrating an exemplary device detection process accommodating different types of memory card pin layouts.

Because so many memory cards exist that have the same general form factor, but potentially different pin configurations and uses, there needs to be some way for the host device to ascertain what type of card has been inserted. An exemplary process 120 for determining what type of card has been inserted is illustrated in FIG. 5. Process 120 starts at block 122 and the first electronic device 52 sends a CMD5 message to the card in the receptacle 26 (block 124). If the card replies at block 126, then first electronic device 52 determines that the card in the receptacle 26 is a secure digital input output (SDIO) card (block 128). If, however, no reply is provided at block 126, then the first electronic device 52 sends a CMD41 message to the card in the receptacle 26 (block 130). If the card replies at block 132, the first electronic device 52 determines that the card in the receptacle 26 is an SD card (block 134). If, however, no reply is provided at block 132, then the first electronic device 52 sends a CMD1 message to the card in the receptacle 26 (block 136).

With continued reference to FIG. 5, if the card replies at block 138, then first electronic device 52 determines that the card in the receptacle 26 is an MMC (block 140). If, however, no reply is provided at block 138, then the first electronic device 52 infers that the card in the receptacle 26 is operating according to an M-PHY protocol and changes to an M-PHY interface and attempts to access the card (block 142). If the card in the receptacle 26 replies at block 144, then the host device 52 determines that the card in the receptacle 26 is an M-PHY compliant device (block 146). If the card in the receptacle 26 still does not reply, then the process generates an error (block 148).

While the process 120 has contemplated and recited specific commands to determine if the card inserted into the receptacle 26 was a particular type of card, it should be appreciated that the standards for each of these card types have a plurality of unique commands (i.e., a command that exists only for that standard and does not have a corresponding command in other standards (e.g., a command that exists only for SD, but not for MMC, UHS, etc.)). Thus, other commands may be used to help make the determination as to which card type is inserted without departing from the scope of the present disclosure.

While the above discussion has focused on repurposing pins within a memory card form factor, the present disclosure is not so limited. Additionally, the present disclosure contemplates using a Universal Flash Storage (UFS) storage system in conjunction with memory card form factors. Of note is that UFS has heretofore only been proposed for fixed memory units such as the flash memory soldered on the board of computing devices. UFS has been strongly tied to the M-PHY protocol as evidenced by the JEDEC publication UFS PHY and UNIPRO® by Yuping Chung, published Oct. 12, 2011, which is hereby incorporated by reference in its entirety. While Chung contemplates UFS implemented through an M-PHY physical layer, Chung does not contemplate using UFS with detachable memory cards or using M-PHY via a standardized connector as described above to communicate with memory cards. The present disclosure contemplates extending UFS capabilities by making it usable for detachable memory card connectors, using readily available card form factors and the repurposing techniques disclosed herein.

While the present disclosure has focused on repurposing particular pins from the various memory card standards to M-PHY usage, it should be noted that any pins on the memory card form factor can be repurposed to carry the transmitter and receiver differential pairs. As a matter of design choice, it makes more sense to repurpose the data pins from the memory card form factors to act as transmitter and receiver differential pairs under the M-PHY usage. Likewise, in many instances it makes sense to preserve the purpose of the other memory card form factor pins in the M-PHY usage. For example, it makes sense to preserve a ground connection as a ground connection. Likewise, pins that are designated as power pins may be preserved as power pins in the M-PHY system. Such preservation of pin functionality promotes interoperability and allows designers familiar with one system to adapt readily to pin layouts in the repurposed system. It is worth repeating that while only SD and MMCplus have been explicitly illustrated, the concepts of the repurposing illustrated thereby are applicable to the various other memory card connectors such as Compact Flash (I and II), Secure Digital (SD) (SD, miniSD, microSD, SDHC, miniSDHC, microSDHC, SDXC), Memory Stick (Standard, Pro, Pro Duo, Pro-HG Duo, Micro (M2), xC), MultiMediaCard (MMC) (MMC, RS-MMC, MMCmobile, MMCplus, MMC-micro, eMMC), Serial Peripheral Interface (SPI), xD (Standard, Type M, Type H, Type M+), XQD, and Ultra High Speed (UHS) (I and II).

As a further note, the use of a shared clock can be provided (either using the existing clock pin or using a different pin repurposed to carry a clock signal). Use of a shared clock allows usage of M-PHY Type II and is also consistent with UFS that uses M-PHY Type I (even though M-PHY Type I does not require a clock), since UFS requires a clock signal.

In an alternate embodiment, not illustrated, the memory may be a write only memory needing only a TXDP/TXDN pair, so only two pins would be needed for data transfer. An exemplary situation for such usage would be a monitoring station, sensory array, or telemetry system wiring the data to memory but never reading it back (e.g., written in a surveyor, rocket, weather balloon, airplane black box or the like).

The operation of the M-PHY communications protocol using a memory card form factor interface and related devices, systems, and methods, according to embodiments disclosed herein, may be provided in or integrated into any processor-based device. Examples, without limitation, include a set top box, an entertainment unit, a navigation device, a communications device, a fixed location data unit, a mobile location data unit, a mobile phone, a cellular phone or smart phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 6:
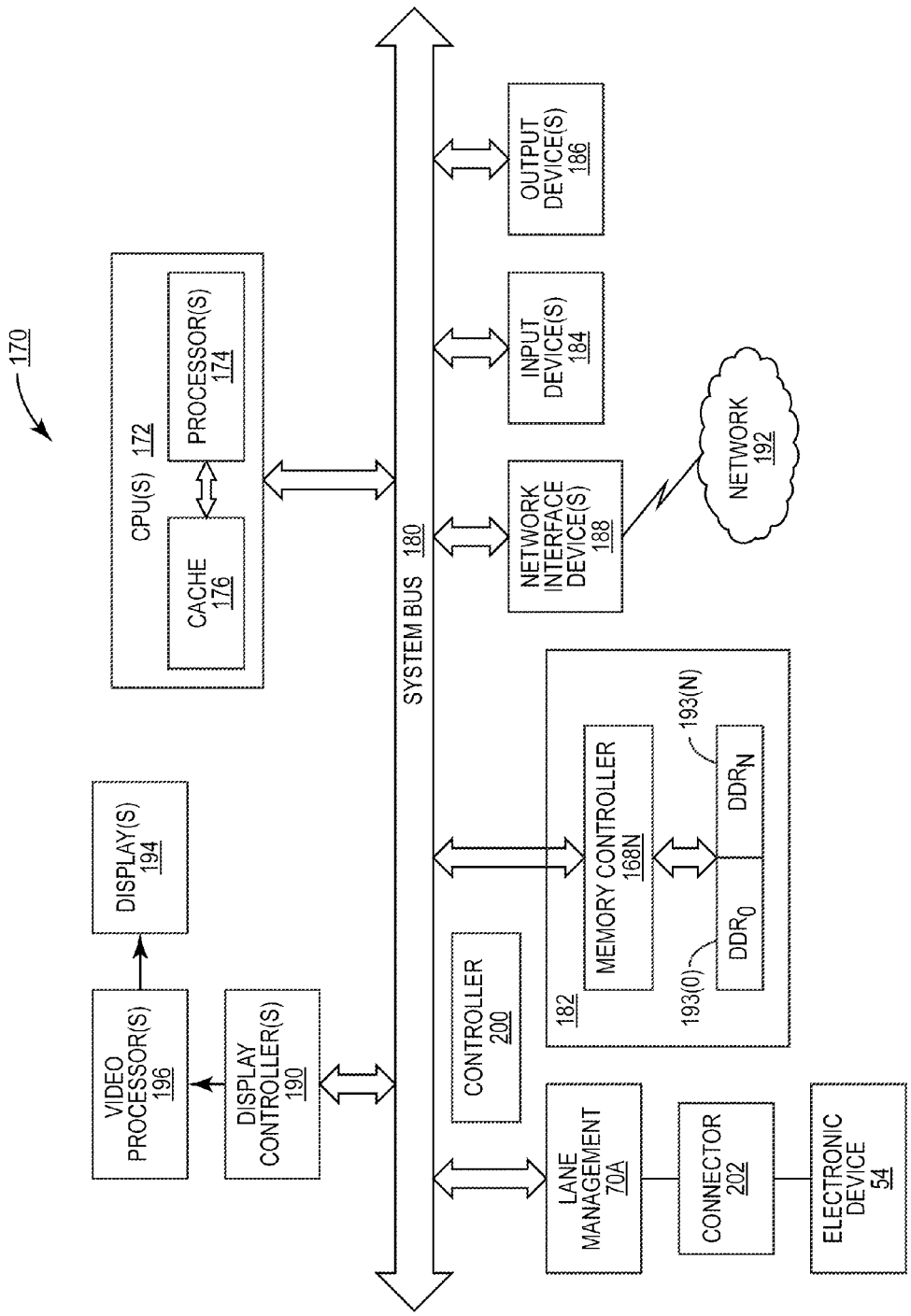
FIG. 6 is a block diagram of exemplary processor-based electronic devices and systems, any of which can include a memory card style connector having pins mapped to M-PHY standard data paths according to the embodiments disclosed herein.

In this regard, FIG. 6 illustrates an example of a processor-based system 170 that can employ the memory card style connector with the mapping of FIGS. 2A-2D (or other mapping consistent with the concepts disclosed herein) applied thereto. A controller 200 interoperates with the lane management module 70A as illustrated. For the sake of FIG. 6, the memory card style connector is referred to as connector 202. In this example, the processor-based system 170 includes one or more central processing units (CPUs) 172, each including one or more processors 174. The CPU(s) 172 may be a master device. The CPU(s) 172 may have cache memory 176 coupled to the processor(s) 174 for rapid access to temporarily stored data. The CPU(s) 172 is coupled to a system bus 180 and can intercouple master devices and slave devices included in the processor-based system 170. The system bus 180 may be a bus interconnect. As is well known, the CPU(s) 172 communicates with these other devices by exchanging address, control, and data information over the system bus 180. For example, the CPU(s) 172 can communicate bus transaction requests to the memory controller 168(N) as an example of a slave device. Although not illustrated in FIG. 6, multiple system buses 180 could be provided, wherein each system bus 180 constitutes a different fabric.

Other master and slave devices can be connected to the system bus 180. As illustrated in FIG. 6, these devices can include a memory system 182, one or more input devices 184, one or more output devices 186, one or more network interface devices 188, and one or more display controllers 190, as examples. The input device(s) 184 can include any type of input device, including but not limited to input keys, switches, voice processors, etc. The output device(s) 186 can include any type of output device, including but not limited to audio, video, other visual indicators, etc. The network interface device(s) 188 can be any devices configured to allow exchange of data to and from a network 192. The network 192 can be any type of network, including but not limited to a wired or wireless network, private or public network, a local area network (LAN), a wide local area network (WLAN), and the Internet. The network interface device(s) 188 can be configured to support any type of communication protocol desired. The memory system 182 can include one or more memory units 193(0-N). The arbiter may be provided between the system bus 180 and master and slave devices coupled to the system bus 180, such as, for example, the memory units 193(0-N) provided in the memory system 182.

The CPU(s) 172 may also be configured to access the display controller(s) 190 over the system bus 180 to control information sent to one or more displays 194. The display controller(s) 190 sends information to the display(s) 194 to be displayed via one or more video processors 196, which process the information to be displayed into a format suitable for the display(s) 194. The display(s) 194 can include any type of display, including but not limited to a cathode ray tube (CRT), a liquid crystal display (LCD), a plasma display, etc.

The CPU(s) 172 and the display controller(s) 190 may act as master devices to make memory access requests to an arbiter over the system bus 180. Different threads within the CPU(s) 172 and the display controller(s) 190 may make requests to the arbiter.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/ or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of ascertaining what sort of card has been put into a host device receptacle, comprising:
   detecting insertion of a memory card connector into a memory card form factor receptacle;
   determining if the memory card connector is associated with a memory card or if the memory card connector is associated with circuitry configured to operate according to an M-PHY protocol;
   operating in a first mode if the determining determines that the memory card connector is associated with the memory card; and
   operating in a second mode if the determining determines that the memory card connector is associated with the circuitry configured to operate according to the M-PHY protocol.

2. The method of claim 1, wherein determining if the memory card connector is associated with the memory card comprises sending a command associated with a memory card standard and detecting a response.

3. The method of claim 1, wherein determining if the memory card connector is associated with the memory card comprises sending a plurality of commands, each command uniquely associated with a different memory card standard and evaluating whether a response is generated by each of the plurality of commands.

4. The method of claim 1, further comprising determining if the memory card connector is associated with circuitry configured to operate according to a memory card standard selected from the group consisting of: Compact Flash (I and II), Secure Digital (SD) (SD, miniSD, microSD, SDHC, miniSDHC, microSDHC, SDXC), Memory Stick (Standard, Pro, Pro Duo, Pro-HG Duo, Micro (M2), xC), MultiMediaCard (MMC) (MMC, RS-MMC, MMCmobile, MMCplus, MMCmicro, eMMC), Serial Peripheral Interface (SPI), xD (Standard, Type M, Type H, Type M+), XQD, and Ultra High Speed (UHS) (I and II).

5. The method of claim 1, further comprising determining if the memory card connector is associated with the circuitry configured to operate according to an M-PHY standard coupled with a universal flash storage (UFS) system.

6. The method of claim 1, further comprising detecting a power pin associated with the memory card connector.

7. The method of claim 6, further comprising providing power through the power pin.

8. A method of ascertaining what sort of card has been put into a host device receptacle, comprising:
   detecting insertion of a memory card connector into a memory card form factor receptacle;
   providing a first command to logic within the memory card connector, the first command uniquely associated with a first memory card communication protocol;
   determining if a first reply to the first command is provided from the logic within the memory card connector to a host device;
   if no first reply is provided, providing a second command to the logic within the memory card connector, the second command associated with a second memory card communication protocol;
   determining if a second reply to the second command is provided from the logic within the memory card connector to the host device; and
   if no second reply is provided, interacting with circuitry associated with the memory card connector through the memory card connector according to an M-PHY protocol.

9. The method of claim 8, wherein the first memory card communication protocol comprises a secure digital (SD) protocol.

10. The method of claim 8, wherein the second memory card communication protocol comprises a MultiMediaCard (MMC) protocol.

11. The method of claim 8, further comprising determining if the memory card connector is associated with circuitry configured to operate according to a memory card standard selected from the group consisting of: Compact Flash (I and II), Secure Digital (SD) (SD, miniSD, microSD, SDHC, miniSDHC, microSDHC, SDXC), Memory Stick (Standard, Pro, Pro Duo, Pro-HG Duo, Micro (M2), xC), MultiMediaCard (MMC) (MMC, RS-MMC, MMCmobile, MMCplus, MMCmicro, eMMC), Serial Peripheral Interface (SPI), xD (Standard, Type M, Type H, Type M+), XQD, and Ultra High Speed (UHS) (I and II).

12. The method of claim 8, further comprising determining if the memory card connector is associated with the circuitry configured to operate according to an M-PHY standard coupled with a universal flash storage (UFS) system.

13. The method of claim 8, further comprising detecting a power pin associated with the memory card connector.

14. The method of claim 13, further comprising providing power through the power pin.

15. A non-transitory computer readable medium comprising software with instructions to:
    detect insertion of a memory card connector into a memory card form factor receptacle;
    determine if the memory card connector is associated with a memory card or if the memory card connector is associated with circuitry configured to operate according to an M-PHY protocol;
    operate in a first mode if the determining determines that the memory card connector is associated with the memory card; and
    operate in a second mode if the determining determines that the memory card connector is associated with the circuitry configured to operate according to the M-PHY protocol.

16. The computer readable medium of claim 15 wherein the instructions to determine if the memory card connector is associated with the memory card comprise instructions to send a command associated with a memory card standard and detect a response.

17. The computer readable medium of claim 15 wherein the instructions to determine if the memory card connector is associated with the memory card comprise instructions to send a plurality of commands, each command uniquely associated with a different memory card standard and evaluate whether a response is generated by each of the plurality of commands.

18. The computer readable medium of claim 15 wherein the instructions further comprise instructions to determine if the memory card connector is associated with the circuitry configured to operate according to an M-PHY standard coupled with a universal flash storage (UFS) system.

19. A computing device, comprising:
    a receptacle configured to hold a memory card connector and having electrical contacts configured to mate to contacts in a memory card form factor; and
    a control system operatively coupled to the electrical contacts and configured to:
        detect insertion of the memory card connector into the receptacle;
        determine if the memory card connector is associated with a memory card or if the memory card connector is associated with circuitry configured to operate according to an M-PHY protocol;
        operate in a first mode if the determining determines that the memory card connector is associated with the memory card; and
        operate in a second mode if the determining determines that the memory card connector is associated with the circuitry configured to operate according to the M-PHY protocol.

20. The computing device of claim 19 wherein the receptacle comprises a power pin and the control system is configured to provide power to the memory card connector through the power pin.

* * * * *